US006462768B1

(12) United States Patent
Oakley (10) Patent No.: US 6,462,768 B1
(45) Date of Patent: Oct. 8, 2002

(54) IMAGE ENHANCEMENT (75) Inventor: John P. Oakley, Manchester (GB)

(73) Assignee: The Victoria University of Manchester, Manchester (GB)

( * ) Notice: Subject to any disclaimer, the term of this patent is extended or adjusted under 35 U.S.C. 154(b) by 0 days.

(21) Appl. No.: 08/981,959

(22) PCT Filed: Jul. 12, 1996

(86) PCT No.: PCT/GB96/01657

§ 371 (c)(1),
(2), (4) Date: Feb. 20, 1998

(87) PCT Pub. No.: WO97/04417 Feb. 6, 1997

(30) Foreign Application Priority Data

Jul. 19, 1995 (GB) ............................................. 9514834

(51) Int. Cl.⁷ ................................................. H04N 7/18
(52) U.S. Cl. ......................................... 348/31; 382/260
(58) Field of Search ........................... 348/31, 121–169; 382/260–267

(56) References Cited

U.S. PATENT DOCUMENTS

| | | | |
|---|---|---|---|
| 5,140,463 A | * 8/1992 | Yoo et al. | .................... 359/559 |
| 5,233,541 A |   8/1993 | Corwin et al. | |
| 5,303,051 A | * 4/1994 | Levesque et al. | .............. 348/31 |
| 5,719,567 A | * 2/1998 | Norris | ......................... 340/953 |
| 5,886,662 A | * 3/1999 | Johnson | ........................ 342/25 |
| 6,028,624 A | * 2/2000 | Watkins | ......................... 348/31 |
| 6,195,099 B1 | * 2/2001 | Gardiner | ...................... 345/426 |

FOREIGN PATENT DOCUMENTS

DE    41 02 579    8/1991

OTHER PUBLICATIONS

S. Tomey, "Atmospheric Aerosols", 1977, Elsevir, pp. 232–237.*

John P. Oakley and Brenda L. Satherley., "Improving Image Quality in Poor Visibility Conditions Using a Physical Model for Contrast Degradation", Feb. 1998, IEEE Transactions on Image Processing, vol. 7, No. 2, pp. 167–179.*

Johimaru, "Electromagnetic Wave Propagation Radiation and Scattering", 1991, Prentin Hall, pp. 278–297.*

(List continued on next page.)

*Primary Examiner*—Andy Rao
(74) *Attorney, Agent, or Firm*—Nixon & Vanderhye P.C.

(57) ABSTRACT

An image of a scene partially obscured by atmospheric backscattered light is enhanced by taking account of variations in the mean backscattered flux component resulting from variations in the distance between the point from, which the image is captured and points in the terrain contributing to the scene. A series of images of the scene is captured, and an averaged image is produced in which each pixel has a brightness which is an average of the brightness of those portions of the captured images that represent the same region of the scene as that pixel. A model is defined to represent the relationship between the brightness of a pixel of the averaged image and the distance between the point of view from which the image represents and the point in the scene represented by that pixel of the image. An estimate of the contribution of atmospheric backscattered light to the brightness of each pixel of the image is computed from the model. The estimated contribution for each pixel is then subtracted from the brightness of that pixel of the image to produce a modified brightness for that element. The image is reconstructed with each element of the reconstructed image having a brightness which is a function of the modified brightness of that element.

19 Claims, 5 Drawing Sheets

OTHER PUBLICATIONS

John P. Oakley and Kokkeong Tan, "Physics-based Approach To Color Image Enhancement in Poor Visibility Conditions", Oct. 2001, J. Optical Society Of America, A/vol. 18, No. 10, pp. 2460–2467.*

Patent Abstract of Japanese Patent No. 59–006679, vol. 8, No. 88 (E–240), Apr. 21, 1984, 1 page.

Patent Abstract of Japanese Patent No. 01–140382, vol. 13, No. 391 (P–926), Aug. 30, 1989, 1 page.

Putsay, M., "A Simple Atmospheric Correction Method for the Short Wave Satellite Images", International Journal of Remote Sensing, vol. 13, No. 8, May 20, 1992, pp. 1549–1558.

Tajbakhsh et al, "Inter-frame Registration and Preprocessing of Image Sequences", SPIE, vol. 1521, Image Understanding for Aerospace Applications (1991), pp. 14–22.

* cited by examiner

IMAGE ENHANCEMENT

BACKGROUND OF THE INVENTION

1. Field of the Invention

The present invention relates to image enhancement, and in particular to a method and apparatus for enhancing an image of a scene partially obscured by atmospheric backscattered light.

2. Description of Related Art

Various techniques are known for enhancing images of scenes which are obscured by light backscattered from, for example, the atmosphere. For example, a camera may be mounted on an aircraft to obtain a view of the terrain scene over which that aircraft is flying. Assuming that the scene is obscured by low mist, cloud or other atmospheric effects, the intensity of light reaching the camera from those terrain features contributing to the scene is reduced. A small amount of light scattered from the terrain does reach the camera, but this is obscured by light scattered from the mist or cloud. There are many known methods for enhancing the contrast of images in such circumstances, but the maximum improvement in the quality of the image is limited by three factors.

Firstly, the gain of the camera or other sensing system is set, usually by an automatic gain control, to the maximum brightness of the image. When the scattered light component is large the transmitted terrain component becomes small in comparison with the quantisation noise of the sensor.

Secondly, the backscattered light often has a random component, and this is a source of noise which is amplified by any contrast-stretching transformation implemented by the sensor.

Thirdly, in low light conditions, statistical fluctuations in the transmitted photon flux give rise to Poisson noise in the image. This noise will be amplified by any transformation that increases the range of contrasts present in the image.

It is known to generate an enhanced image of a scene by averaging information related to the scene captured in the form of a series of images representing its appearance from a series of different positions. This technique relies upon prior knowledge of the scene in that the enhanced image is generated by allocating to each pixel of the enhanced image a brightness which is the average of the brightness of those portions of the series of images that represent the same part of the scene as that pixel of the enhanced image. This requires knowledge of the position, relative to the scene, from which each of the series of images was captured and details of the terrain, so that compensation can be made for motion of the aircraft as the series of images is generated. Given knowledge of the position from which each image of that terrain was captured, and the field of view represented beach of the series of images, the images can, in effect, be overlaid in appropriate positions so as to enable computation of the average brightness values. A Digital Terrain Elevation (DTE) database is already available, together with accurate information about instantaneous aircraft velocity and attitude, from on board navigation systems in many modern aircraft. The known motion-compensated image averaging systems do provide a significant improvement in image quality in conditions of high sensor noise.

Enhanced images generated using the known motion-compensated averaging systems may be further improved by contrast enhancement. Various contrast enhancement algorithms are known, for example variance normalisation or histogram equalisation. In practice however such known contrast enhancement algorithms have not provided particularly good results.

SUMMARY OF THE INVENTION

It is an object of the present invention to provide an improved method and apparatus for enhancing an image of a scene partially obscured by backscattered light.

According to the present invention, there is provided a method for producing an enhanced image of a scene partially obscured by backscattered light, wherein an image of the scene is captured, a model is defined to represent the relationship between the brightness of a pixel of the image and the distance between the point the view from which the image represents and the point in the scene represented by that pixel, an estimate of the contribution of backscattered light to the brightness of each pixel of the image is computed from the model, the estimated contribution for each pixel is subtracted from the brightness of that pixel to produce a modified brightness for that pixel, and the enhanced image is formed by allocating to each pixel of the image a brightness which is a function of the modified brightness of that pixel.

Suitably, prior to processing, a series of images of the scene is captured and an averaged image is produced in which each pixel has a brightness which is an average of the brightness of those portions of the captured images that represent the same region of the scene as that pixel, the averaged pixel then being processed. Alternatively, a series of images may be processed separately and then averaged.

The invention also provides an apparatus for producing an enhanced image of a scene partially obscured by backscattered light, comprising means for capturing an image of the scene, means for defining a model to represent the relationship between the brightness of a pixel of the image and the distance between the point the view from which the image represents and the point in the scene represented by that pixel of the image, means for computing an estimate of the contribution of backscattered light to the brightness of each pixel of the image from the model, means for subtracting the estimated contribution for each pixel from the brightness of that pixel of the image to produce a modified brightness for that pixel, and means for reconstructing the image to form the enhanced image with each pixel of the enhanced image having a brightness which is a function of the modified brightness of that pixel.

The present invention is based on the realisation that the mean backscattered flux component in an image of a scene obscured for example by cloud will vary according to the distance between the point from which the image was captured and the points in the terrain represented in the image. Depending on the type of views, this distance (or depth) will vary across the image. This is particularly the case with aircraft flying generally horizontally across the surface of the earth. The invention considers these image-plane variations of depth and as a result is robust to variations in mean backscatter.

The model may be defined by reference to a plot of the depth/brightness relationship for the individual image to be enhanced.

The brightness of each pixel of the enhanced image may be computed from the modified brightness of that pixel scaled to restore the image contrast, for example by computing the contribution of light from the scene to the brightness of each pixel of the image on the basis of the model, dividing the modified brightness for each pixel by the estimated contribution from the scene for that element, and multiplying the resultant by the a constant to determine the brightness of the pixel in the enhanced image.

BRIEF DESCRIPTION OF THE DRAWINGS

An embodiment of the present invention will now be described, by way of example, with reference to the accompanying drawings, in which.

DETAILED DESCRIPTION OF THE INVENTION

The method of image enhancement described below has three steps, that is image averaging, parameter estimation, and contrast transformation. Image averaging techniques used are conventional.

Figure 1:
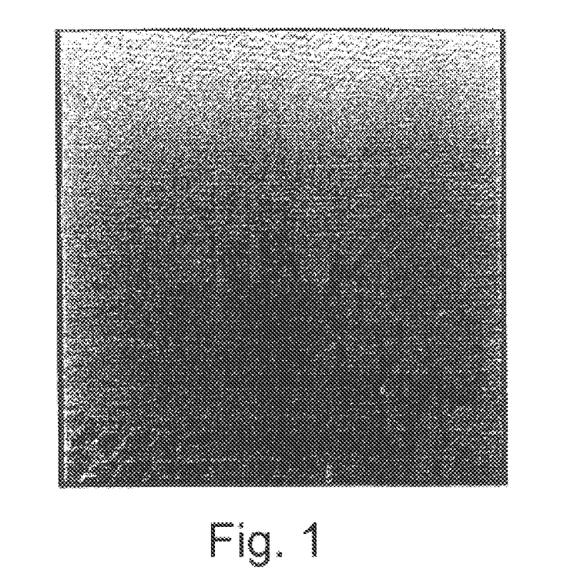
FIG. 1 is a single unprocessed optical image captured by an airborne camera.

The images described below were obtained from a standard video camera with a field of view of 30°. The camera was mounted on an aircraft of an angle at approximately 15° to the horizontal. Information about the current position, velocity and orientation of the aircraft was made available from an on board Inertial Navigation System (INS). A database of terrain height values was stored in the onboard computer. FIG. 1 represents a single unprocessed image generated by the camera. The image is of a scene including a major road, vehicles travelling on that road, bridges across the road, and various terrain features to both sides of the road. The features of the scene are obscured by low level cloud. A series of ten images was taken by the camera as the aircraft travelled relative to the imaged scene. Motion-compensated averaging was then applied, the averaging being computed over the ten image frames. The image averaging is performed such that the "averaged" image at frame N is derived from the sum of a number of previous frames, using a geometric transformation to correct for the camera movements. As a result a time-averaged image is maintained which always s reflects the current camera position and orientation. Each pixel in this averaged image corresponds to some particular point of the terrain which contributes to the image. Assuming worldspace (terrain) co-ordinates (x, y, z) this can be written as the sum:

$$p = \frac{1}{M} \sum_{k=0}^{M-1} I_c(x_k, y_k). \tag{1}$$

where M is the number of images involved in the averaging process, $I_k$ the input image frame k. $(x_k, y_k)$ is the position of the point (x, y, z,) in frame k. The averaging process described by equation (1) has two effects:

$$\frac{1}{\sqrt{M}}$$

1. The sensor noise is reduced by a factor of approximately
2. The statistical fluctuations in the backscattered component are also reduced by a similar factor.

Figure 2:
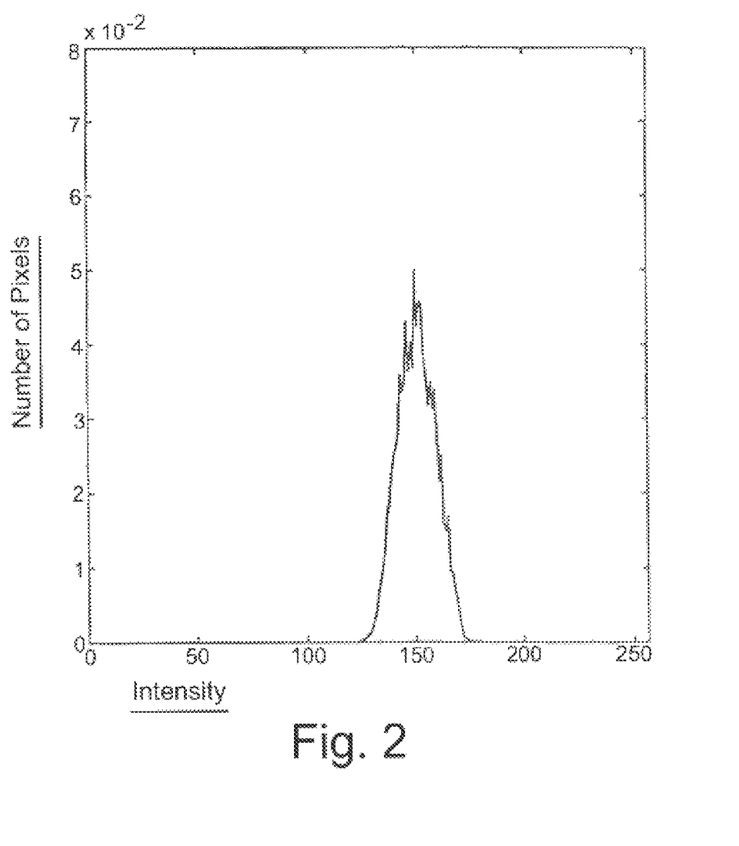
FIG. 2 is a histogram of the image of FIG. 1 plotting the intensity against the number of pixels in the image having particular intensities.
Figure 3:
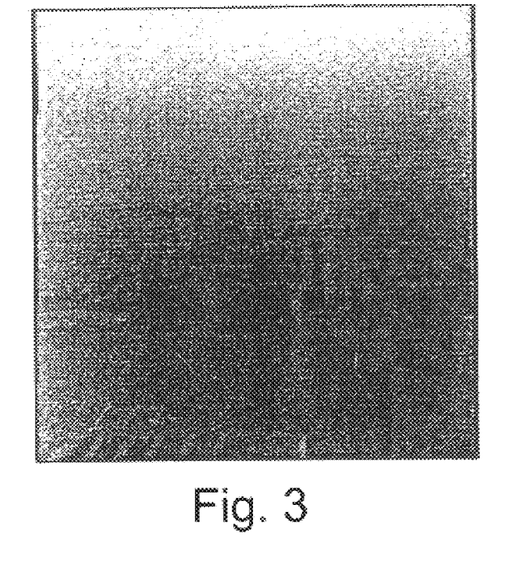
FIG. 3 is an image of the same scene as that represented in FIG. 1 but representing the image resulting from the motion-compensated average of ten frames captured sequentially.
Figure 4:
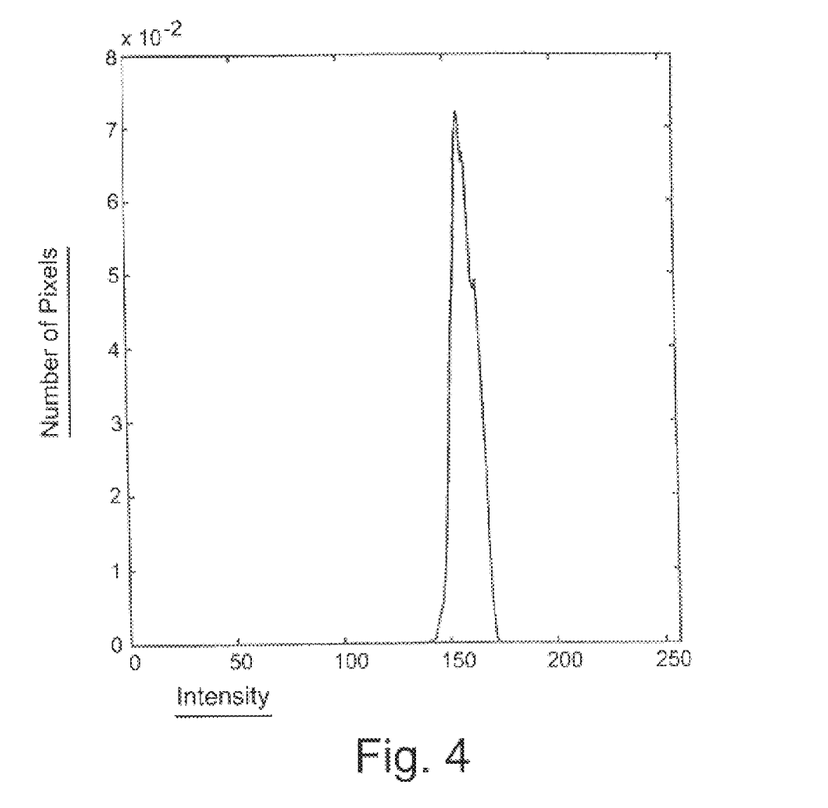
FIG. 4 is a histogram corresponding to that of FIG. 2 but relating to the image of FIG. 3.

FIG. 2 is a histogram based on the image of FIG. 1 and representing the number of pixels in that image having the identified intensities. This histogram is dominated by the backscattered light from the cloud. FIG. 3 shows the image which results from the motion-compensated average of ten frames, and FIG. 4 is a histogram corresponding to that of FIG. 2 but in respect of the image of FIG. 3. FIG. 4 shows a narrower distribution of values around the mean gray level than FIG. 2. The light flux which has been reflected from the terrain is contained within this relatively narrow peak and can now be recovered by contrast enhancement. Various contrast enhancement algorithms such as variance normalisation or histogram equalisation are suitable for this purpose. One simple algorithm which could be used applies the transformation y=mx+c to the image gray levels, with the constant m chosen to give good image contrast. In practice however the mean backscattered flux component will vary according to the distance between the camera and the terrain. Depending on the type of view, this distance (or depth) will vary across the image. As a result the known contrast enhancement algorithms do not result in a very significant improvement in the quality of the image represented in FIG. 3. The present invention however considers these image-plane variations of depth and as a result is robust to variations in mean backscatter.

In accordance with the invention, the backscatter contribution is estimated in each pixel in the image. This is achieved by considering the depth to brightness relationship of many of the pixels in the averaged image. A parametric model is then fitted to the depth/brightness data using a numerical data-fitting algorithm. The resulting model parameters are then used to calculate backscatter at any image pixel. This method of backscatter estimation also provides parameters for contrast enhancement.

Figure 5:
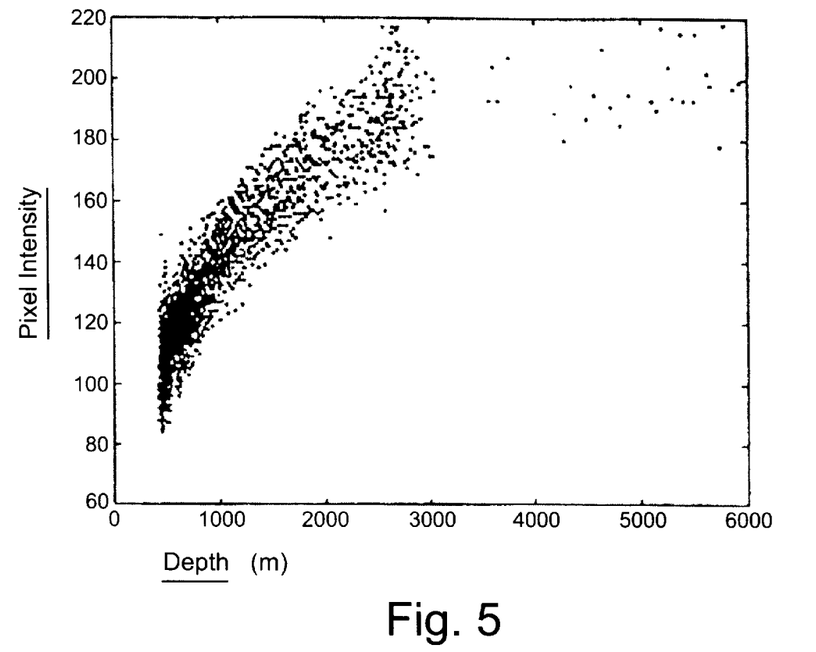
FIG. 5 plots the depth to brightness relationship of the pixels of the image of FIG. 1.
Figure 6:
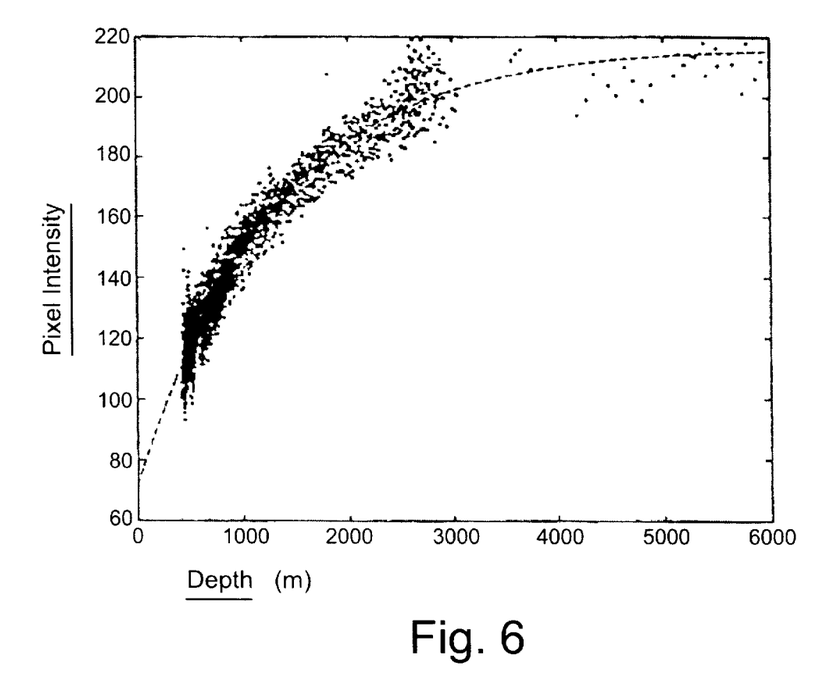
FIG. 6 plots the depth to brightness relationship of the pixels of FIG. 3.

FIG. 5 plots the depth to brightness relationship of the pixels of the image of FIG. 1. FIG. 6 plots the same data for FIG. 3. As might be expected, the motion-compensated average image of FIG. 3 shows less scatter and therefore represents a better starting point for the application of the present invention.

The steps of parameter estimation and contrast transformation in one implementation of the present invention will now be described.

An estimate for the backscatter contribution, b=b(d), at each pixel of the image of FIG. 3 may be obtained from the equation:

$$b(d) = C(1 - \exp(-Kd)), \tag{2}$$

where C is a constant which depends on the illumination and the sensor conversion factor, K is the extinction coefficient which characterises the scattering profile of the fog/mist/cloud particles, and d is the depth at each pixel. Similarly, an estimate for the transmitted terrain contribution at each pixel is given by $$t(d) = T \exp(-Kd) \quad (3)$$

where T is a constant depending on C and the nature of the terrain scene. According to the depth-based model, the overall brightness p(d) at a pixel with a depth d is the sum of the backscatter b(d) and the light reflected from the terrain t(d), that is $$p(d) = b(d) + t(d) \quad (4)$$
$$= C(1 - \exp(-Kd)) + T\exp(-Kd)$$

In order to estimate the parameters T, C and K, a three parameter model was fitted to the brightness/depth plot of FIG. 6. This model is defined by the equation $$p(d) = c_0 + c_1 \exp(-Kd), \quad (5)$$

The model fit is carried out by using a numerical optimisation algorithm to determine values for $c_0$, $c_1$, and K such that the total least squares difference, defined $$\sum_{all\ i,j} [p(i,j) - (c_0 + c_1 \exp(-Kd(i,j)))]^2$$

where p(i,j) is the brightness of the averaged image at pixel (i,j) and d(i,j) is the corresponding depth, is minimised. The dotted line in FIG. 6 shows the parametric model. The estimated values for $c_0$, $c_1$, and K were 217.55, −145.65 and 0.773 respectively.

The backscatter estimate b(i,j) at pixel (i,j) is then given by $$b(i,j) = c_0(1 - \exp(-Kd(i,j))) \quad (7)$$

and the terrain contribution t(i,j) is given by $$t(i,j) = (c_0 + c_1)\exp(-Kd(i,j)) \quad (8)$$

Note that the estimate for t(i,j) takes account of the attenuation of the terrain-reflected light by the scattering medium.

Figure 7:
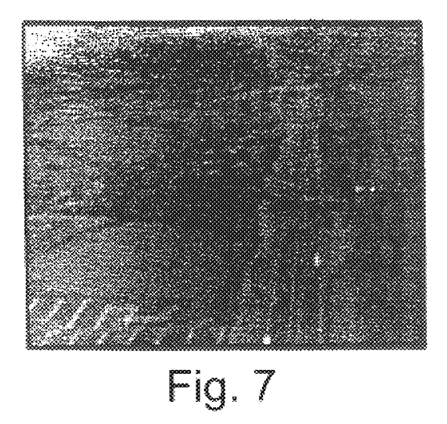
FIG. 7 is an image derived from the image of FIG. 3 in accordance with the present invention.

The enhanced image e(i,j) at pixel (i,j) is then generated from the formula $$e(i,j) = (p(i,j) - b(i,j))\frac{128}{t(i,j)} \quad (9)$$

where b(i,j) and t(i,j) are calculated using equations (7) and (8) respectively. This is equivalent to subtracting the backscatter and scaling to restore full contrast. Note that the images are quantified to 256 gray levels. The final result is shown in FIG. 7.

Subsequent to the experiments described above it was realised that the image data was gamma encoded, i.e. that the pixel values were not proportional to incident flux but to the flux raised to the power 0.45 (approximately). When this non-linear encoding is reversed, different values are obtained for the parameters $c_0$, $c_1$, and K. In particular the value of K for the image shown in FIG. 1 is significantly lower, approximately 0.4 km$^{-1}$. The revised values of $c_0$ and $c_1$ are 135,032 and −120,613 respectively.

Figure 8:
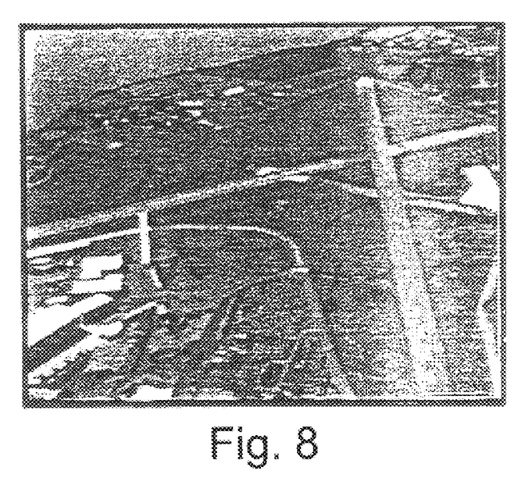
FIG. 8 is a further unprocessed image captured by an airborne camera.
Figure 9:
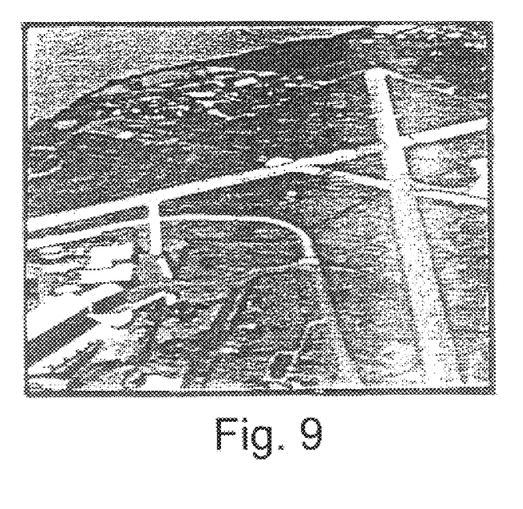
FIGS. 9 and 10 are processed images derived from the image of FIG. 8 using respectively the method of the present invention and a conventional image processing method.
Figure 10:
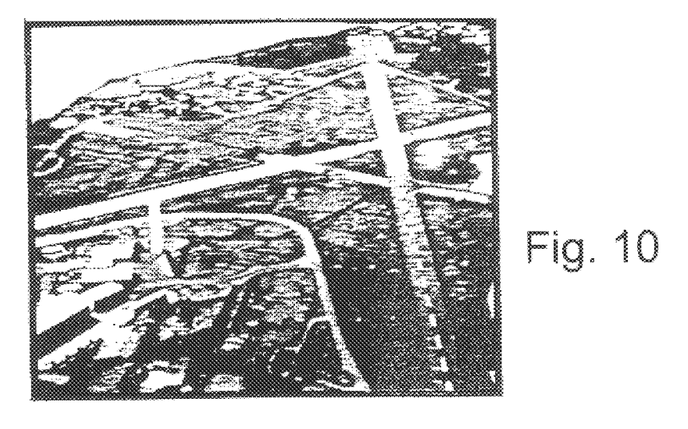

The images shown in FIGS. 8–10 illustrate the superiority of the image enhancement provided by the backscatter estimation and image enhancement algorithms over a conventional contrast stretch algorithm (histogram equalisation) in fairly good visibility conditions. FIG. 8 shows an original image of an airstrip with two runways, with little attenuation of the image by mist. FIG. 9 shows the image processed using the above described algorithms, and FIG. 10 shows the image after processing by the contrast stretch algorithm. The contrast stretched image of FIG. 10 has an artificial appearance, whereas FIG. 9 has a natural appearance.

Further refinement of the image enhancement process may be achieved by compensating for variations in the solid angle subtended by individual pixels across the array. This has a significant effect because, although the variation is only of the order of 10%, the scattered light contribution is proportional to this factor and may be much larger than the terrain contribution.

The solid angle $\Omega_k$ is a fixed geometric constant associated with the position of the sensor element in the image plane. $\Omega_k$ may be calculated from $$\Omega_k = \frac{Af}{(f^2 + x_k^2 + y_k^2)^{3/2}} \quad (10)$$

where A is the active area of a single sensor element, f is the focal length, and $x_k$ and $y_k$ are the x and y offsets of pixel k from the optical centre in the image plane. Compensation for variation of the solid angle across the image is achieved by dividing each pixel value by the solid angle.

Figure 11:
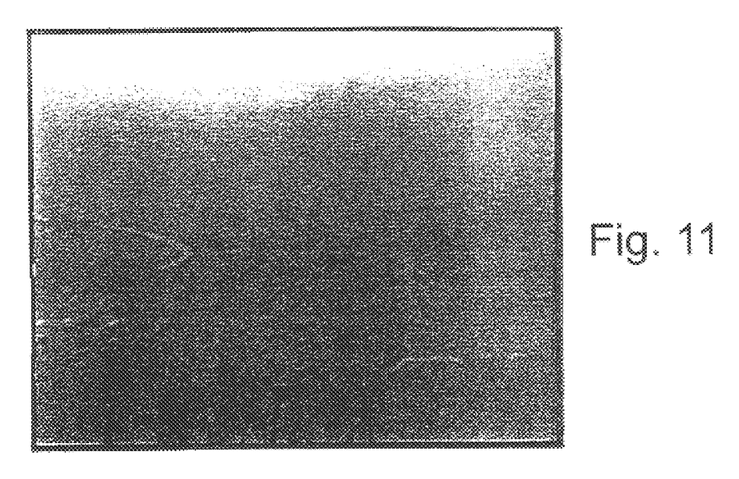
FIG. 11 is a further unprocessed image captured by an airborne camera.
Figure 12:
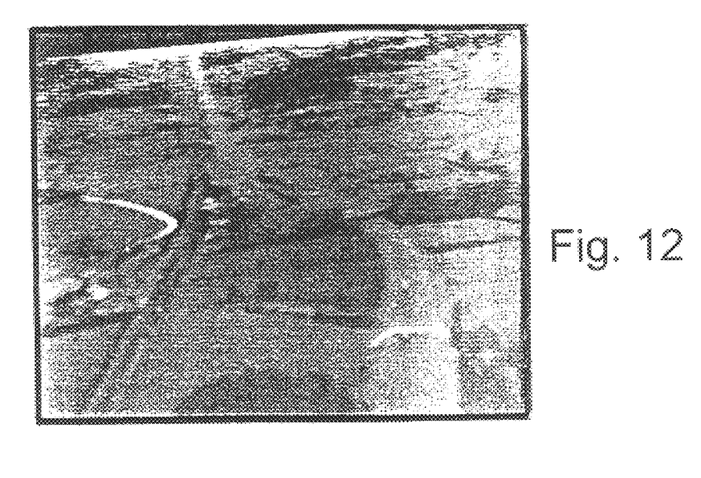
FIG. 12 is an image derived from a series of images including that of FIG. 11 in accordance with the invention.

FIG. 11 shows one of a series of three images captured with an airborne camera, and FIG. 12 shows an enhanced image obtained by reversing the gamma-encoding by the camera to make the pixel values proportional to the brightness of the terrain, averaging the three images, and then compensating for the variation of solid angle. A similar enhanced image to that depicted in FIG. 12 was achieved by processing each of the three images individually and averaging the enhanced images.

A problem with the averaging process whereby several images are summed together to improve the ratio of signal-to-noise is that uncertainties in the position of the aircraft give rise to blurring in the foreground of the averaged image. To overcome this, the amount of averaging may be varied with respect to the depth of the image. In such an arrangement, pixels relating to very distant terrain points (near the horizon) are averaged many times, whilst pixels relating to points close to the camera (i.e. the bottom of the image) may be averaged over only two or three images, or may be bypassed by the averaging algorithm.

This method is particularly effective because the signal-to-noise ratio (SNR) in the enhanced image is a strong function of depth and tends to be much lower for very distant points, whereas the SNR at lower depths is often much greater.

One convenient way of achieving this type of variable averaging is by using a digital filter with a variable bandwidth. One suitable filter is described by the difference equation $$y[n] = \alpha x[n] + (1-\alpha)y[n-1], \quad (11)$$

where x[n] is the nth image of the sequence, y[n] is the filtered version of x[n], and y[n−1] is the filtered version of the (n−1)th image. The noise reduction properties of the filter (11) depend on the choice of the constant α; the smaller the value for α, the greater the noise reduction effect. The Noise Factor of this filter is $$\sqrt{\frac{2-\alpha}{\alpha}}.$$

This means that, provided the image noise is not correlated in time for successive frames, the standard deviation in the output y[n] is a factor of $$\sqrt{\frac{\alpha}{2-\alpha}}$$

less than that of the input x[n]. Thus, in order to maintain an signal-to-noise (SNR) of, for example 10, α must be chosen so that $$\sqrt{\frac{2-\alpha}{\alpha}} \approx \sqrt{\frac{2}{\alpha}} = \frac{10}{SNR_{av}}. \quad (12)$$

and so the required value for α is $$\alpha x = 0.02 SNR_{av} \quad (13)$$

The SNR may be estimated in various ways. One available method is based on the assumption that the noise in the backscatter is multiplicative Gaussian and that the noise in the image is the sum of the backscatter noise and noise generated in the sensor itself. The SNR as a function of depth is then given by $$SNR = 0.02 \left( \frac{t(i \cdot j)^2}{\sigma_{sc}^2 + b(i \cdot j)^2 \sigma_{sc}^2} \right) \quad (14)$$

where $\sigma_s$ is the variance of the sensor noise and $\sigma_{sc}^2$ is the variance of the backscatter noise.

If α is greater than unity then this indicates that no filtering is required. If the scene is static then temporal averaging may be applied directly to the image pixels and small values of α may be used, leading to low noise levels in the filtered images. In the case of dynamic images, if the camera motion is known, a motion compensated variation on equation (11) may be applied. This is given by $$y[n] = \alpha x[n] + (1-\alpha) y[n-1], \quad (14)$$

where y[n−1] is the value of the pixel corresponding to y[n] in the (n−1)th image frame.

Although in the above embodiments of the invention, an image averaging routine is performed prior to estimation of the backscatter contribution to the image and contrast enhancement, it will be appreciated that the backscatter estimation and contrast enhancement routines may be applied to single images from a series of which an average image is subsequently generated. One advantage of performing the processing in this order is the avoidance of the problem of image degradation caused by depth values corresponding to particular pixels varying significantly over the averaging interval.

It will also be appreciated that the backscatter estimation and image enhancement algorithms may be applied to single images, with no image averaging routine being used either before or after the enhancement.

It will be appreciated that alternative methods for estimating the backscattered contribution could be used. For example the backscattered contribution could be estimated by applying a low-pass filter to the averaged image. However, this estimate would be degraded by any low spatial frequency components in the terrain signals. Also the size of the filter kernel would have to be small with respect to the expected variation in depth. This would mean that the backscatter estimates from the filter would be subject to a greater degree of random uncertainty that with the estimation method described above.

It will also be appreciated that alternative algorithms could be applied to contrast transformation, that is the final generation of the enhanced image from the estimated backscatter and transmitted terrain contributions.

One possible application of the invention, would be in image classification. Assuming that the illumination of the processed image is uniform, the terrain contribution t(i,j) calculated from equation (8) will yield information as to the reflectivity of the elements included in the image. The reflectance factors corresponding to different terrain cover, for example grass, trees and water, are fixed. The terrain contribution t(i,j) may be scaled so that it gives a direct estimate for the local reflectance factor for pixel (i,j). A simple computer program could store the calculated values of t(i,j) and then convert them into possible terrain properties.

It will be appreciated that the invention is applicable to infra-red images as well as to visible light.

What is claimed is:

1. A method for producing an enhanced image of a scene partially obscured by atmospheric backscattered light, wherein an image of the scene is captured, a progressive model is defined to represent the relationship between the brightness of a pixel of the image and the distance between the point of view from which the image represents and the point in the scene represented by that pixel, an estimate of the contribution of backscattered light to the brightness of each pixel is subtracted from the brightness of that pixel, which is then scaled to produce a modified brightness for that pixel, and the enhanced image is formed by allocating to each pixel of the image a brightness which is a function of the modified brightness of that pixel.

2. A method according to claim 1, wherein the captured image of the scene which is processed is formed by capturing a series of images of the scene, and producing an averaged or time-filtered image in which each pixel has a brightness which is an average of the brightness of those portions of the series of captured images that represent the same region of the scene as that pixel.

3. A method according to claim 1, wherein a series of enhanced images of the scene are formed, and an averaged or time-filtered image is produced in which each pixel has a brightness which is an average of the brightness of those portions of the series of enhanced images that represent the same region of the scene as that pixel.

4. A method according to claim 2, wherein the number of images or the bandwidth of the temporal filter used to produce an average brightness value for each pixel, varies as a function of the distance from the image plane of that portion of the scene represented by the pixel.

5. A method according claim 1, wherein each element of the enhanced image has a brightness computed from the modified brightness of that pixel scaled to restore image contrast.

6. A method according to claim 5, wherein an estimate of the contribution of light from the scene to the brightness of each pixel of the image is computed from the model, and the modified brightness for each pixel is divided by the estimated contribution from the scene for that pixel and multiplied by a constant to determine the element brightness in the reconstructed image.

7. A method according to claim 1, in which each pixel brightness value is divided by the solid angle subtended by that pixel.

8. An apparatus for producing an enhanced image of a scene partially obscured by atmospheric backscattered light, comprising means for capturing an image of the scene, means for defining a progressive model to represent the relationship between the brightness of a pixel of the image and the distance between the point of view from which the image represents and the point in the scene represented by that pixel of the image, means for computing an estimate of the contribution of backscattered light to the brightness of each pixel of the image from the model, means for subtracting the estimated contribution for each pixel from the brightness of that pixel of the image means for scaling the result of the subtraction to produce a modified brightness for that pixel, and means for reconstructing the image to form the enhanced image with each pixel of the enhanced image having a brightness which is a function of the modified brightness of that pixel.

9. An apparatus according to claim 8 wherein means are provided for capturing a series of images and producing an averaged image in which each pixel has a brightness which is an average of the brightness of those portions of the captured images that represent the same region of the scene as that pixel, the model defining means representing the relationship between brightness and distance of pixels of the averaged image.

10. An apparatus according to claim 8, comprising means for forming a series of enhanced images of the scene, and means for forming an averaged image in which each pixel has a brightness which is an average of the brightness of those portions of the series of enhanced images that represent the same region of the scene as that pixel.

11. A method for producing an enhanced image of a scene partial obscured by an obscuring source, the method comprising:

capturing an image of the scene;

defining a progressive model to represent a relationship between a brightness of a pixel of the image and the distance between the point of view from which the image represents and a point in the scene represented by that pixel;

computing a contribution of the obscuring source to the brightness of each pixel of the image from the model;

subtracting the contribution for each pixel from the brightness of that pixel;

scaling at least one pixel to produce a modified brightness for that pixel; and forming an enhanced image by allocating to each pixel of the image a brightness which is a function of the modified brightness of that pixel.

12. A method according to claim 11, wherein the obscuring source is atmospheric backscattered light.

13. A method according to claim 11, wherein determining the contribution of the obscuring source comprises estimating a contribution of the obscuring source from the model.

14. A method according to claim 11, wherein the captured image of the scene which is processed is formed by capturing a series of images of the scene, and producing an averaged or time-filtered image in which each pixel has a brightness which is an average of the brightness of those portions of the series of captured images that represent the same region of the scene as that pixel.

15. A method according to claim 11, wherein a series of enhanced images of the scene are formed, and an averaged or time-filtered image is produced in which each pixel has a brightness which is an average of the brightness of those portions of the series of enhanced images that represent the same region of the scene as that pixel.

16. A method according to claim 14, wherein the number of images or the bandwidth of the temporal filter used to produce an average brightness value for each pixel, varies as a function of the distance from the image plane of that portion of the scene represented by the pixel.

17. A method according to claim 11, wherein each element of the enhanced image has a brightness computed from the modified brightness of that pixel scaled to restore image contrast.

18. A method according to claim 17, wherein an estimate of the contribution of the obscuring source from the scene to the brightness of each pixel of the image is computed from the model, and the modified brightness for each pixel is divided by the estimated contribution from the scene for that pixel and multiplied by a constant to determine the element brightness in the reconstructed image.

19. A method according to claim 11 in which each pixel brightness value is divided by the solid angle subtended by the pixel.

* * * * *